US012676921B1

(12) United States Patent
Shen et al.

(10) Patent No.: US 12,676,921 B1
(45) Date of Patent: Jul. 7, 2026

(54) WIRELESS INTERCONNECT PROXY TO CONNECT MULTIMEDIA DEVICES AND COMPUTER SYSTEMS

(71) Applicant: Sorrento Technology Holdings, Inc., San Diego, CA (US)

(72) Inventors: Ji Shen, San Diego, CA (US); Fenggang Wu, Los Vegas, NV (US); Bruce Barnes, Escondido, CA (US)

(73) Assignee: Pathway Innovations Inc., Las Vegas, NV (US)

( * ) Notice: Subject to any disclaimer, the term of this patent is extended or adjusted under 35 U.S.C. 154(b) by 0 days.

(21) Appl. No.: 18/513,382

(22) Filed: Nov. 17, 2023

Related U.S. Application Data

(60) Provisional application No. 63/536,297, filed on Sep. 1, 2023.

(51) Int. Cl.
| | |
|---|---|
| *H04L 69/16* | (2022.01) |
| *H04L 65/612* | (2022.01) |

(52) U.S. Cl.
CPC .......... *H04L 69/161* (2013.01); *H04L 65/612* (2022.05)

(58) Field of Classification Search
CPC ........................... H04L 69/161; H04L 65/612
See application file for complete search history.

(56) References Cited

U.S. PATENT DOCUMENTS

| | | | | |
|---|---|---|---|---|
| 2008/0285945 | A1* | 11/2008 | Rajakarunanayake | ...................... H04N 21/64322 386/231 |
| 2009/0177781 | A1* | 7/2009 | Mosek | ................ H04L 67/1097 709/228 |
| 2015/0256580 | A1* | 9/2015 | Morton | .............. H04N 21/6125 709/219 |
| 2015/0281047 | A1* | 10/2015 | Raju | ....................... H04L 49/70 709/244 |
| 2019/0079557 | A1* | 3/2019 | Jung | ..................... G06F 1/1605 |
| 2022/0294883 | A1* | 9/2022 | Pope | ....................... H04L 47/34 |
| 2023/0199034 | A1* | 6/2023 | Li | ......................... H04W 76/10 709/228 |

* cited by examiner

*Primary Examiner* — Phuoc H Nguyen
*Assistant Examiner* — Steven C Nguyen
(74) *Attorney, Agent, or Firm* — Trevor Coddington

(57) ABSTRACT

A dedicated extension and emulation proxy for wirelessly extending and emulating several USB-based data stream protocols, such as UVC, UAC, and HID, and standards for connecting high-definition video devices, such as HDMI, in a proxy fashion. The dedicated hardware and software extend these multimedia interfaces over a wireless network link through an emulation wrapper or proxy. The host computer does not virtually see the existence of the wireless connection because its network hardware and software are bypassed to compartmentalize point-to-point networking away from the host computer. The multimedia interface of the host computer is extended wirelessly using surrogate stacks along with protocol emulation transcoding.

18 Claims, 9 Drawing Sheets

500

505                                                                        520

510                              515                    525

505                    510

510          515

WIRELESS INTERCONNECT PROXY TO CONNECT MULTIMEDIA DEVICES AND COMPUTER SYSTEMS

CROSS-REFERENCE TO RELATED APPLICATION

The present application claims priority to U.S. Provisional Patent Application No. 63/536,297, filed on Sep. 1, 2023, and entitled "Dedicated Extension and Emulation Proxy for Universal Serial Bus," the entire disclosure of which is incorporated by reference herein.

BACKGROUND OF THE INVENTION

1. Field of Invention

The invention relates to a wireless extension of a physical multimedia interface, such as a universal serial bus (USB), through a driverless protocol emulation proxy.

2. Description of Related Art

Universal Serial Bus (USB) provides an expandable, hot-pluggable plug-and-play serial interface that ensures a standard, low-cost connection between computers and peripheral devices such as keyboards, mice, joysticks, printers, scanners, storage devices, modems, and video conferencing cameras over a single wire. USB was designed to standardize the connection of peripherals to personal computers, both to communicate with and to supply electric power. It has largely replaced interfaces such as serial and parallel ports and has become commonplace on various computing devices and accessories.

USB-connected devices have the benefit of being recognized by any host computer operating systems popularly used today. Drivers, which are low-level systems that control the logic for interacting with external devices and comply with the USB standard, are globally supplied by major technology vendors such as Microsoft, Apple, and Google, in conjunction with chip manufacturers such as Intel, AMD, etc. These built-in driver implementations are mainly transparent to users and device makers. The audio data stream, video data stream, and storage file system data stream, along with one or more Human Interface Devices (HID) such as a keyboard, mouse, and touchpad, are received, recognized, and processed in operating systems (OS) as USB Audio Class (UAC), USB Video Class (UVC), or USB Mass Storage Class (UMSC), and HID data streams. From the standpoint of an accessory device manufacturer, as long the data stream complies with the USB standard and is in the format of a UAC, UVC, UMSC, or HID, there is no need to supply their proprietary driver software because the OS' built-in drivers recognize and accept such incoming data automatically.

Furthermore, once the OS recognizes the device that is "plugged" into a USB port on the host computer, all applications on the OS will be able to "see" the device as a USB device. The operating system has a standard pipeline interface for the applications (apps) to communicate with the device, such as receiving a video stream via a video "pin" software interface. From a device supplier's standpoint, this is considered a driverless implementation. Such a driverless environment offers users a greatly simplified installation and usage experience. The term "plug-and-play" describes this driverless experience fittingly. The plug-and-play nature of USB-connected devices is, therefore, highly desirable.

However, the highly desirable driverless arrangement only functions in the setting of a wired or cable-connected environment. As it is readily apparent, using wires and cables, especially for video communication, creates multiple constraints. For example, wires restrict how other electronic devices are positioned. In many situations, such as being in a video conference with participants being physically present inside a conference room, a long USB cable, often more than ten feet long, is required to connect a camera to a computer to run video conference software. In other situations, a multitouch-enabled interactive flat panel (IFP) placed in the front of a room needs to be "driven" by a computer at a distance more than several feet away, such as ten to thirty feet. In touchscreen embodiments, data for touch events at multiple points on the screen must be sent to the computer via the long USB cable so that "whiteboard" software on the computer can process such data with the proper software response.

In a parallel domain of connecting high data throughput external devices to a host computer via a network, such as a wireless digital camera that "streams" a large amount of multimedia data to live or playback terminals, the wireless devices must communicate through an installed network interface card (NIC) in the host computer, and through the transmission control protocol/internet protocol (TCP/IP) software stack, also commonly referred to as the open systems interconnection (OSI) stack and communicate via specialized network protocols such as Wi-Fi and Bluetooth. The NIC can be an original equipment manufacturer (OEM) device built into a host computer and is physically invisible to users, or the NIC can take the form of an aftermarket plugged-in dongle. Regardless of the physical presence form factor, a NIC must be present to facilitate network communications. Network data streams are typically divided and organized into TCP/IP or network "packets" with destination and source IP addresses attached to the data payload. Software interfaces called sockets or TCP/IP ports are implemented on the host computer and the wireless device side to send and receive these data packets. Each vendor who wishes to use the network data must develop a software application that can communicate through the TCP/IP stack with its own predefined one or more sockets to send and receive packets. The network sockets or ports are unique and private to each vendor's application-level software. Such a mechanism limits the data flow from the NIC hardware layer to sockets and then upstream to a vendor's driver or application-level software. In other words, the network-transmitted data streamed from the wireless device on the remote end, i.e., the remote device, is not visible to other applications, nor is it accessible as data from a global device in the system. To the operating system, the network packets are the responsibility of vendor-specific applications. What the application software does with the network data stream is not of concern to the operating system.

In the example of a wireless video camera device, even though a vendor's viewer software on the host computer can communicate with the camera through TCP/IP sockets, the OS does not know that the network data stream received is from a camera but rather just generic network data. This is in contrast to the USB media pipeline described above, and there is no universal driver provided by OS vendors such as Microsoft, Apple, or Google. Therefore, the video or audio stream from the wireless camera does not appear visible or accessible to the OS, nor is it visible or accessible to any other application software. Only the camera viewer vendor can communicate and recognize the existence of the wireless camera device. To the OS or an application like Microsoft Teams, Zoom, Google Meet, or another third-party camera viewer software, there isn't a wireless camera available for access. Such a closed loop or opaque data pipeline ensures network data is securely sent, received, controlled, and processed only within the confines of a given vendor's proprietary "walled garden" or "data bubble." However, such a closed loop or opaqueness obstructs open compatibility. The requirement for a proprietary driver or application-level software must be present to facilitate the data flow within the closed loop or "walled garden." The nature of the domain of network connection is that it is the only path for connecting a device over IP or through a wireless networking protocol like Wi-Fi or Bluetooth. In doing so, however, the driverless and plug-and-play level of simplicity of a device connected via USB cable or wire is lost, negatively affecting user experience.

There is more than one network connectivity topology. Devices on a network can communicate in the mode of peer-to-peer connection, or they can all communicate with an access point (AP). Regardless of the connection mode, all network-connected devices interacting with any host computer system must follow the same NIC-to-TCP/IP-sockets-to-vendor-software closed loop. The drawbacks of losing the plug-and-play simplicity and wide compatibility for universal, easy access to the device remain as the disadvantages of a wireless network-connected device.

In other words, all network-configured devices today fall within the networking domain. They do not overlap or interconnect with the USB media pipeline domain. Even though it is possible to create a software virtual tunnel to bring network data pipeline in as input for the USB domain and masquerade a network-attached device as a USB device, this is a highly complex and expensive undertaking. Such a virtual tunnel often must be implemented at the system driver level, which is specific to each and every operating system. Given rampant malware and virus software attacks in effectively every OS being used, OS vendors are highly cautious in allowing additional virtual drivers to be installed. Such a virtual tunnel driver may not be feasible in certain OS environments. This could be why there is no commercial software driver implementation in Windows, Apple OS, and Android that bridges the networking domain and the USB media pipeline domain.

Another critically important aspect of the networking software stack is that the NIC-TCP/IP-APP closed-loop data pipeline, as the status quo, only executes on a host computer device with a complete operating system, such as Windows, MacOS, or Android. The NIC card and the TCP/IP software stack physically must co-exist with the USB connectors on the same host device as the destination for the multimedia device to connect to. Yet another aspect regarding all network-attached devices is that they must have drivers or proprietary or special-purpose software. None of them today has the driverless and plug-and-play capabilities.

For example, the USB/IP Project provides a general USB device-sharing system over IP. In a client host, a virtual host controller interface (VHCI) driver is implemented as a USB host controller driver. The VHCI driver emulates an actual USB host controller interface for virtual attachment/detachment, enumeration, and initialization of remote USB devices. It encapsulates USB request blocks and transmits USB/IP requests to remote server hosts. A stub driver is implemented as a USB per-device driver in a server host. The stub driver decapsulates USB/IP requests into USB requests and then submits them to real USB devices. Yet, the NIC card and the TCP/IP stack in the host computer are utilized along with virtual drivers on the host computer to create a virtual USB connection.

In a seemingly related prior art but different use case, a widely used device is a wireless mouse, also known as a wireless pointer device. One popular method to connect a mouse device to a host computer is using a small dongle that plugs into a USB port while letting the dongle communicate with the mouse device itself via a certain type of radio frequency (RF) protocol, such as infrared, Bluetooth, or others. This method's limitation is that a proprietary driver must be installed for the host computer to recognize the dongle, and the driver must process a proprietary data stream. The transferred data stream must be minimal as the RF technology is limited to low speed and bandwidth. In this case, the data stream must be of simple format, such as the (x, y) coordinates of the mouse pointer location.

Another popular method to connect a mouse device to a host computer is to implement a Bluetooth client software stack in the device, connect directly with a host computer without a dongle, and appear as a Bluetooth device. This is the case for Apple's Magic Mouse. However, a Bluetooth mouse is a special device, and the data being transmitted is a small amount, primarily as (x, y) coordinates of the pointer location. The software protocol employed is a Bluetooth device-specific protocol, in other words, the specific and industry-standard Bluetooth device drivers implemented by major operating system vendors. This differs from a USB device, and the device protocol can be considered a much simplified and limited TCP/IP stack alternative.

It is also widely known that Bluetooth headphones can utilize the Bluetooth device communication protocol now supported by all major operating systems to link microphone and headphone audio signals to a host computer. This link is also the Bluetooth device protocol specifically designed and implemented for Bluetooth devices, which is typically limited in the number of such Bluetooth devices allowed to connect. For example, most PC laptops allow only 2 to 4 Bluetooth devices to be recognized. This makes the networking protocol stack, TCP/IP, unnecessary. The data stream over Bluetooth also must be low throughput and take up low bandwidth.

The challenge is to create a mechanism that allows a remote multimedia device such as a video camera to connect to a host computer wirelessly through a TCP/IP network, yet requires no proprietary driver or special application software. It is highly desirable to preserve the plug-and-play simplicity of a wired USB device in a driverless fashion yet through a wireless link. The end effect would be a network-configured camera that appears on a host system in the same manner as a wired-connected USB local device. It is as if the remote device is connected to a physical multimedia interface through an invisible wire.

There is a need for technical improvement in computer networks to connect high data throughput multimedia devices such as a remote digital video camera or a remote laptop screen sharing video data mixing audio, video, and images along with generic data such as remote-mounted SSD drives, or printers, via wireless networking links to a host computer with integrated physical multimedia ports such as, but not limited to a USB host port or HDMI port. The host computer may be a smart device, like a personal computer, an interactive flat panel, a virtual reality head mount display, a tablet, etc. Importantly, there is a need for technical improvement in such wireless communication connections to immediately function with simplicity and the best ease of use in the same fashion as using a plug-and-play wired device like a USB webcam.

SUMMARY OF THE INVENTION

The present invention overcomes these and other deficiencies of the prior art by providing a modular proxy hardware apparatus in the form of, for example, a compact self-enclosed dongle device with a plural of input and output multimedia ports of various types, along with methods for accepting networking TCP/IP data stream. The dongle implements a self-encapsulated TCP/IP stack for connecting a remote device, then transcoding an input data stream through software emulation, and then outputting, through primarily USB ports, standard USB UVC, UAC, UMSC, and HID data streams to a host computer device, as a metaphorical "bridge" between wireless networking and USB. One can also refer to this apparatus as an external, physically separate, "dedicated proxy" device that communicates with the host computer, bypassing the host computer's regular TCP/IP stack, in the form of a standard USB client device but connected via a wireless network, extending the typical wired multimedia connections wirelessly for a remote device generating a multimedia data stream. A pair of such apparatuses, peer-to-peer, achieves the effect of uniting a remote device to a host computer via a bi-directional invisible wire that the host computer device treats the remote device as if it was locally connected via a wire or a cable. In reality, there is not any visible or physical wire connecting them.

The NIC card, along with the execution of TCP/IP or other network communication protocol software stack which typically "runs" on host computer devices, i.e., PCs, tablets, interactive flat panels (which are virtually running Android OS nowadays), or other smart mobile devices, are bypassed or "relocated" and encapsulated into the dongle. This dedicated separate and independent dongle apparatus is referred to as a dedicated extension and emulation proxy (DEEP) wireless USB dongle, or DEEP dongle for short, due to its being a proxy or a bridge between the wireless networking domain and plug-and-play USB domain, and its physical nature of being a dedicated independent module.

In an embodiment of the invention, a computer device implementing a self-encapsulated TCP/IP stack and communicating via a network link with a peer computer device physically connected to a remote device comprises a first computer comprising an embedded operating system and a network interface component, wherein the first computer receives, via the network link, communications from the peer computer device according to TCP/IP, the communications from the peer computer device comprising a multimedia data stream generated by the remote device; and an output port configured to physically connect the first computer to a host device; and wherein the first computer communicates the media data stream, via the output port, to the host device according to a protocol associated with the output port. The protocol associated with the output port is selected from the group consisting of: USB, HDMI, and analog audio. The network interface component is a network interface card (NIC) comprising a radio frequency (RF) wireless communication module with a 60 GHz transceiver. The first computer is implemented as a system-on-chip (SoC) or an application-specific integrated circuit (ASIC). The computer device may be integrated into the host device. The network link can be a wireless network link. Optionally, the network interface component comprises a plurality of NICs configured to facilitate a network access point (AP) or a router. The computer device may take the form of a USB dongle.

In another embodiment of the invention, a computer device implementing a self-encapsulated TCP/IP stack and communicating via a network link with a peer computer device physically connected to a host device comprises a first computer comprising an embedded operating system and a network interface component, wherein the first computer sends, via the network link, communications to the peer computer device according to TCP/IP, the communications comprising a media data stream; and an input port configured to physically connect the first computer to a local device generating the media data stream; and wherein the first computer receives the media data stream, via the input port, from the local device according to a protocol associated with the input port. The protocol associated with the input port is selected from the group consisting of: USB, HDMI, and analog audio. The network interface component is an NIC comprising an RF wireless communication module with a 60 GHz transceiver. The first computer is implemented as a SoC or ASIC. The computer device may be integrated into a personal computer, tablet, or camera. The network link can be a wireless network link. The network interface component comprises a plurality of NICs configured to facilitate a network AP or a router. The computer device may take the form of a USB dongle.

In another embodiment of the invention, a method of executing a TCP/IP software stack to send and receive network data packets in an encapsulated fashion, bypassing a TCP/IP software stack executing on a host computer device, comprises the steps of pairing two computing devices executing a TCP/IP software stack to send and receive network data packets in an encapsulated fashion, bypassing a TCP/IP software stack executing on a host computer device, wherein one of the two computing devices is physically connected to the host computer device, and communicating a multimedia data stream, via the paired two computing devices between a remote device and the host computer device. The method may further comprise the step of configuring one of the paired computing devices as a network access point to send and receive the network data packets in an encapsulated fashion to a third computing device.

In another embodiment of the invention, a method of transcoding a wirelessly received multimedia data stream to emulate a data stream conforming to a standardized communication format associated with a wired port of a host computer device comprises the steps of receiving, wirelessly, from a remote device, a multimedia data stream from an encapsulated TCP/IP software stack; decoding the received multimedia data stream from TCP/IP; and emulating the decoded received multimedia data stream to the standardized communication format associated with a wired port of a host terminal computer. The method emulates, wirelessly, a wired connection to the remote device. The method may be implemented via a dongle connected to the host computer device via the wired port. The method may further comprise the step of receiving, at the remote device, the multimedia data stream via a communications port coupled to a peripheral device. The method may further comprise the steps of parsing the received multimedia data stream, analyzing the parsed received multimedia data stream to determine a first data format, and selecting a decoder associated with the first data format from a plurality of decoders. The step of decoding the received multimedia data stream from the first data format may comprise the step of restoring data to an uncompressed audio or video format. The step of emulating the decoded received multimedia data stream to the standardized communication format associated with the wired port may comprise the step of determining an output communication port and a second data format as part of an output communication port protocol implemented by the output communication port and selecting an encoder associated with the second data format. The remote device appears to the host computer device, connected via the wired port of the host computer device using the output communication port protocol. The output communication port protocol is selected from the group consisting of: USB Video Class, USB Audio Class, USB Mass Storage Class, USB Human Interface Device, HDMI, and DisplayPort.

An aspect of the present invention's novelty is that unlike other dongle devices, which are typically simple devices, capturing only a peripheral device function, such as a NIC plugged into a USB port or a thumb drive external SSD, the DEEP dongle apparatus is implemented as a full-featured smart mobile computer in and of itself. For example, the DEEP dongle comprises a computer system on a chip (SoC) running a full-featured embedded operating system like an Android mobile phone. It is physically independent and separate from any computer, display, mobile computer, or other end-user terminal device. It also includes a NIC as a built-in peripheral for processing physical layer network communications. Such a SoC plus peripheral implementation enables advanced functions that traditional single-function peripheral dongles cannot handle. Advanced application logic processing with a graphical user interface, directing data flow, software-based data protocol implementation, real-time media content decoding and encoding, and TCP/IP networking software stack all execute on this hardware platform with rich computing resources.

The DEEP dongle apparatuses are typically deployed in some embodiments as a pair, one sending and one receiving, although each dongle can reverse its sending or receiving role. In other words, each dongle apparatus is a transceiver device when performing networking functions. One dongle is connected to a source device, often a remote device, "feeding" the dongle device multimedia data or HID event data through a data communication port on the dongle apparatus, then sending the content data accepted from the source device to the counterpart receiver dongle. The receiver dongle apparatus in the pair is typically connected physically to a host computer, such as a laptop computer, a tablet, an IFP, etc., to relay the data stream received over the wireless link to the host computer.

A further aspect of the DEEP dongle's novelty is that it includes a plural of input ports and output ports so that any device, including Internet of Things (IOT) devices, when connected to the DEEP dongle, can both receive content from remote devices and send out its own content as a source device. This bi-directional nature makes the DEEP dongle(s) an effective wireless docking system. Input ports include, at minimum, a USB host port (either Type A or Type C, supporting compatibility with both USB 2.0 and USB 3.0). Optionally, the dongle may have HDMI input port(s), DisplayPort input port(s), analog audio line-in ports, and other data link ports or connectors. Output ports include, at minimum, a USB OTG (On The Go), also known as a client USB port. Optionally, the dongle may have HDMI output ports, DisplayPort output ports, audio line out port(s), USB Type C combo port(s) which can output both USB data stream and DP port data stream, and optionally other types of data comm port(s).

The DEEP dongle's methods are implemented as software stacks that execute entirely inside the DEEP dongle apparatus. One method of the DEEP dongle is the TCP/IP-based networking software stack. It sends or receives network packets through the locally defined socket interfaces, which are physically executed on the built-in NIC. Another method is the DEEP dongle app, which receives input data streams from the input ports, including data streams received from the TCP/IP stack through the NIC, manages the various types of input data, directs the input data to a built-in decoder (part of the codec), direct the input data to the DEEP transcoder depending on what type of data type is required after an output port is determined, and finally direct the data stream to the physical output ports for output connection to a host computer device. In a typical embodiment, when the DEEP dongle is on the receiver side, the output port is a USB OTG port of either USB3.0 Type C or Type A or USB 2.0 Type A; for the DEEP dongle on the sender side, it typically receives content data through an HDMI input port from a computer, or through a USB host port from a USB webcam video stream source. Subsequently, under the direction and control of the DEEP dongle app, the data stream is sent over the TCP/IP stack socket port via the NIC card to the receiver DEEP dongle.

The present invention's novelty and non-obvious also stems from it being unlike any prior art devices, which necessarily run the TCP/IP network stack on the host computer device, i.e., host computer laptop, tablet, IFP, etc. Instead, the DEEP dongle apparatus relocates and encapsulates the execution of the TCP/IP networking stack inside the dedicated independent DEEP dongle apparatus, away from the host terminal. The data stream transmitted over the network through the TCP/IP stack is internal to these dongles and is between a sender dongle and a receiver dongle, both of which are DEEP dongles. This ensures the typically highly involved network settings, such as SSID, password, firewall security, etc., are predefined during production and before ex-factory usage and are not visible to a user. This is analogous to implementing a surrogate TCP/IP stack inside each DEEP dongle apparatus for the host computer's TCP/IP stack, bypassing the network pipeline data flow entirely. Network data transmission is contained between a sender and receiver dongle or vice versa through the surrogate stacks within the dongles. All media content transmission over the network is processed away from and outside of the host computer. This helps achieve the goal of being connected via a wireless network but accepted by the host computer as a USB local device.

In another aspect of the present invention's novelty, physical connector port output can be implemented as software emulation instead of the traditional protocol implementation only through physical chipsets in ASIC forms. Such software emulation, combined with the DEEP dongle hardware apparatus to create a protocol-compliant data stream, offers much greater flexibility, especially for USB OTG port output. An unlimited number of protocols can be emulated, making expanding future products for a broader number of protocols possible. This was not possible with the traditional ASIC implementation.

The host computer, when receiving the USB data stream, such as a USB Video Class (UVC) data stream, "considers" there is a wired USB camera device connected, will recognize it as a USB camera device in the system device manager (in the embodiment of connecting to a Windows PC host computer); consequently, all applications running on the host computer will be able to "see" the presence of the USB camera device, and can access the video stream from it; for example, Microsoft Teams application or Zoom application will be able to find and display this USB camera as one of the available cameras as if the camera is plugged in through a regular USB cable tethered to the host computer. In reality, the camera is attached to the input USB port on the sender DEEP dongle removed from the computer, possibly on the other side of a room or even in a different room. Accordingly, the camera device is at a location some distance away. The DEEP dongle apparatus is an extension (as in Dedicated Extension and Emulation Proxy), meaning it extends the device away from the host terminal by a distance wirelessly. The aspect of the DEEP dongle App, through the use of the DEEP dongle transcoder, creates a UVC protocol-compliant data stream, the aspect of the DEEP dongle apparatus and its methods serving as an emulation for the USB UVC protocol (as in Dedicated Extension and Emulation Proxy). Therefore, the local receiver DEEP dongle acts as a "proxy" the host computer can "trust" as if the camera at the away and untethered far end is present locally tethered. This aspect of the DEEP dongle apparatus is a Proxy (as in Dedicated Extension and Emulation Proxy).

These novel and non-obvious approaches for wirelessly connecting media and other data sources to host computer devices through paired, fully self-contained proxy dongle implementations bring significant benefits.

First, in the embodiment of output USB connection to a host terminal, USB UVC or UAC data stream complies with the universally supported USB protocol, and there is no driver required to achieve the driverless plug-n-play simplicity; it greatly simplifies the user experience.

Second, such proxy ensures the USB UVC or UAC output is compatible with virtually all commercial operating systems, making it immediately work seamlessly across these OS', including but not limited to Microsoft Windows, Apple MacOS, Google Android OS, various embodiments of the open source Linux OS, along with others.

Third, multiple input and output connector types and various media types are supported; although we have focused on the USB UVC and UAC data streams, multiple embodiments are enabled. For example, allowing HDMI output on the receiver end can support the audio line out in digital or analog modes. In another example, HDMI input instead of USB host port input can be enabled through the sender dongle apparatus; once the DEEP dongle app receives the HDMI input content, the DEEP dongle transcoder can process the re-encoding depending on which the receiver dongle apparatus selects output connector and data type. Bluetooth audio devices and HID devices such as keyboard, mouse, or multi-touch surfaces can all connect to a host device through the DEEP dongle. There is across-media type compatibility.

Fourth, by fully encapsulating the networking protocol stack inside the DEEP Dongle apparatus, the system shields users from having to work on setting up network access. To the user and the host computer device, it is as if there is an invisible wire connecting the remote device to the host, except there is not any physical wire or cable. This further simplifies and improves the user experience.

Fifth, once a device is recognized and becomes accessible on the host terminal, any and all third-party applications can immediately and readily access the USB-connected device. This opens up broad compatibility across a myriad of third-party applications.

In one embodiment, one or more DEEP dongle apparatuses can be configured to have one or multiple NIC cards integrated with the onboard SoC to be deployed as an access point (AP) or router device. As we have described a mostly Peer-to-Peer mode single link communication, the presence of a DEEP dongle AP apparatus enables point-to-multi-point or multipoint-to-multipoint networking, allowing a number of devices to exchange media content or other types of data streams in a multi-station star network topology, often referred to as Station Mode (STA) networking. This further extends the benefit for various devices, a variety of data types, and a number and variety of host computer devices to be interconnected, and more importantly, all in a driverless, easy-to-configure plug-and-play fashion. A possible application for such STA mode is in an in-person classroom instruction environment, when all students and teachers each have computer devices along with a number of audio, video, and interactive tools. The teacher can see every student's computer desktop screen, and a student can easily share work with the rest of the class on a big IFP display at the flip of a software button. Content can be seamlessly and effortlessly shared in virtually every possible combination of device source and destination linkages.

In another aspect of the current invention, the DEEP apparatus pairs and a network of the apparatuses are preferably deployed with a 60 Ghz RF communication protocol, sometimes known as mmWave technology. The 60 Ghz frequency band is an open, unlicensed frequency that the public can use without a license. Its signal range is shorter than Wi-Fi at 2.4 Ghz and 5 Ghz or 6 Ghz or 5G wireless communication technologies. 60 Ghz signal coverage range is typically less than 100 ft for indoor applications and less than a few thousand feet for outdoor applications. However, the transmission speed is much higher than others, like Wi-Fi. Raw network throughput can reach as high as 10 Gbps, and real-world effective data transfer speed can be as high as 3 Gbps or slightly higher. The content sources discussed in the present invention are high throughput and low latency. For example, when transmitting microphone audio data from one device at one location to another device at a different location in the same room, the sound must be synched with the speaker's lip movements. Out of synch sound-lip phenomenon would be highly disconcerting and distracting. For USB video class content, video frames must arrive with the highest possible resolution, such as 4K resolution, with less than 200 ms delays between frames. This makes 60 Ghz particularly beneficial for these highly demanding high throughput and low latency applications.

Furthermore, 60 Ghz RF signal does not penetrate room partitions like drywalls in North America, and it is even more difficult for it to penetrate walls in other parts of the world, like European countries where walls are typically made of concrete or bricks. This characteristic lends itself well to situations where containing signals within a room is desirable, such as corporate conference rooms, secure offices, buildings with many rooms, and schools with numerous classrooms in one location. A 60 Ghz signal contained within room boundaries, forming its own 60 Ghz Private Room Area Network (P-RAN), ensures no across-room signal "pollution" or interference.

One of the problems of Wi-Fi at lower than 6 Ghz frequency band is that all the devices and APs operate within the same frequency range, and signals from all devices con-exist within a 300-meter sphere. At any given time, a mobile phone's Wi-Fi network list can have dozens of networks in an office tower. This nature of Wi-Fi networks is causing "device overcrowding" and "AP overcrowding" as a common problem that challenges network administrators everywhere today.

60 Ghz P-RAN, on the other hand, delivers 3 Gbps of data throughput for every room with no cross-room. Each room can have dozens and up to hundreds of devices connected, ensuring all in-room devices enjoy high-speed networking and, when uplink to internet is enabled, enjoy high-speed internet link without overcrowding across rooms. This highly modular and partitioned nature of 60 Ghz P-RAN is a scalable networking technology for densely occupied buildings with many devices to avoid overcrowding.

In yet another aspect of the 60 Ghz P-RAN, because the signals do not travel across room partitions, most regular internet devices without the 60 Ghz antenna built-in cannot "see" signals in this frequency band. Even when a particular device has a 60 Ghz antenna built-in, the device's operator must be physically in the room to access the signals in transmission. This creates a natural barrier to hacking or network intrusion and offers high network security.

Although the DEEP dongle apparatus and methods are agnostic to networking medium, feasibly and readily adaptable to any networking protocol over IP, including but not limited to the likes of Wi-Fi, Bluetooth, wired ethernet, etc., 60 Ghz wireless RF technology is a preferred wireless technology.

Although only the current commercially adopted USB standard version is mentioned in the description language, the present invention is not limited to USB 3.0 or 2.0. The same system and methods apply to future versions of USB or other technology standards mentioned.

The invention's foregoing and other features and advantages will be apparent from the following, more particular description of the invention's preferred embodiments and the accompanying drawings.

BRIEF DESCRIPTION OF THE DRAWINGS

For a complete understanding of the present invention and its advantages, reference is now made to the ensuing descriptions taken in connection with the accompanying drawings briefly described as follows.

DETAILED DESCRIPTION OF PREFERRED EMBODIMENTS

Figure 1A:
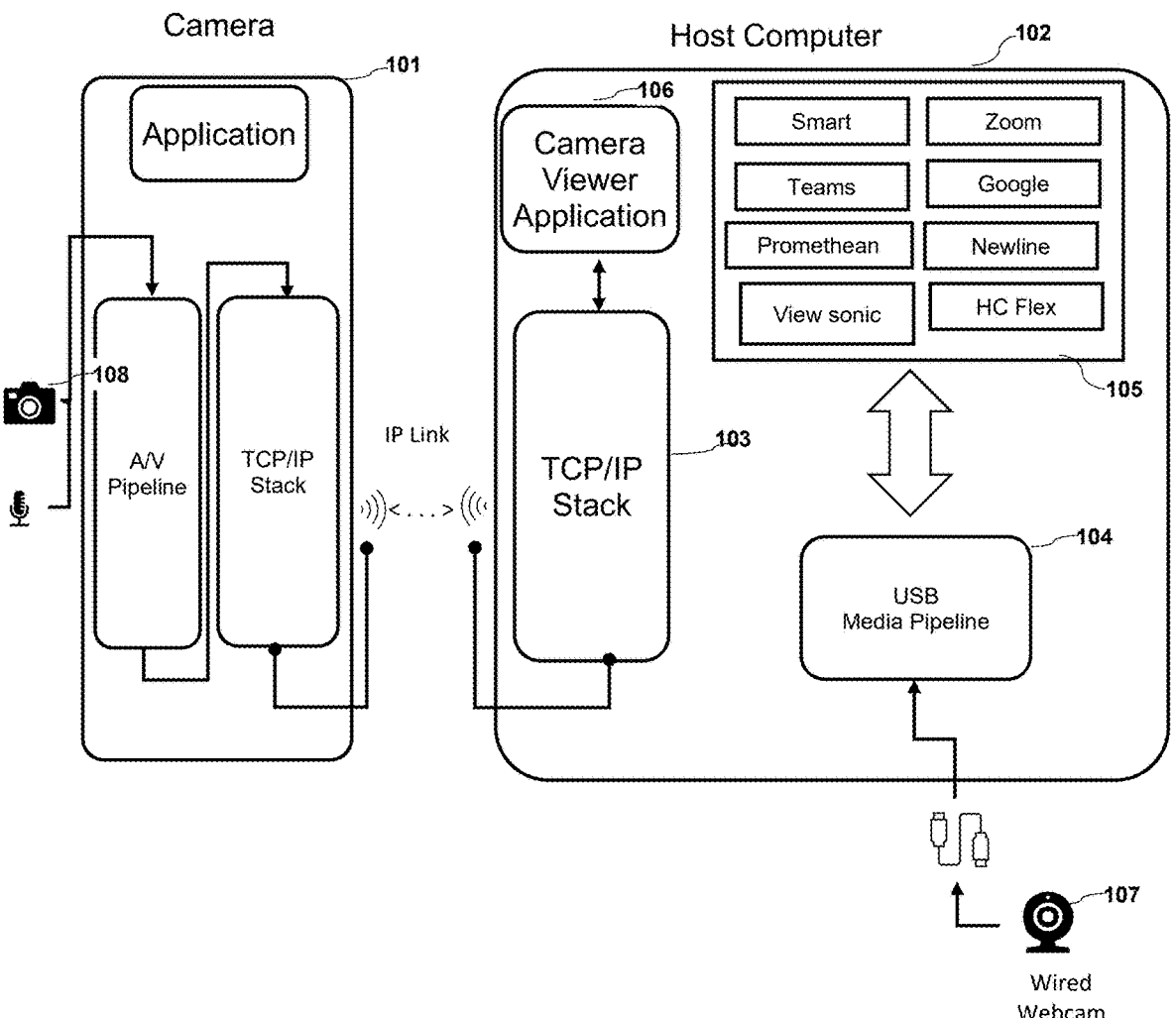
FIG. 1A illustrates how a typical prior art system is configured and functions internally.

Preferred embodiments of the present invention and their advantages may be understood by referring to FIGS. 1-8. The described features, structures, or characteristics of the invention may be combined in any suitable manner in one or more embodiments. It will be apparent to those skilled in the art that various modifications can be made to the present invention without departing from its spirit and scope. Thus, the current invention is intended to cover modifications and variations consistent with the scope of the appended claims and their equivalents.

The present invention overcomes the challenges of creating an operating system-specific virtual driver for a wireless network device to act as a USB device, such as a video camera working as a USB webcam. Obstacles overcome include the need to write a virtual driver for every operating system, which leads to exponentially increased developer workload. In addition, a virtual driver is highly complex and challenging to develop and update. The virtual driver may conflict with other vendors' drivers because brand-specific software is often incompatible with brand-specific software. Operating system updates easily disrupt virtual drivers, and security is not prioritized, opening systems up for security breaches. Further, video streaming via wireless methodologies is error-prone and inefficient because of the updating and constant re-tooling.

The present invention advances the utility of multimedia interfaces such as USB and associated wireless connectivity. The Dedicated Extension and Emulation Proxy described herein can be called a DEEP architecture or DEEP. In an embodiment of the invention, DEEP is dedicated hardware and software for wirelessly extending and emulating several USB-based data stream protocols, such as UVC, UAC, and HID, and standards for connecting high-definition video devices, such as HDMI in a proxy fashion. The dedicated hardware and software extend these multimedia interfaces over a wireless network link through an emulation wrapper or proxy. Thus, the host computer does not virtually see the existence of the wireless link.

In the primary use case application of this invention, achieved is a network of high data throughput devices beyond a specialized Bluetooth device or simple pointer device, such as but not limited to a remote digital video camera or a remote laptop screen sharing desktop video data, mixing audio, video, images, and generic data such as remotely mounted SSD drives, or printers, to connect via wireless networking links to a terminal computing device with the capability of having integrated USB host port(s), which often is a smart device, like a personal computer, an interactive flat panel, a virtual reality head mount display, a tablet, etc. More importantly, the present invention enables such wireless connections to immediately function with such simplicity and the best ease of use in the same fashion as using a plug-and-play wired device like a USB webcam. One can simplify the notion by calling the present invention a wireless USB networking system.

Additionally, a point-to-point 60 GHz network is created by the wireless USB connection device communicating with other peer wireless USB connection devices. 60 GHz is a much higher frequency than other networks, such as Wi-Fi. Because higher frequencies are utilized, only select and authorized users can use the network, eliminating hacking and thus increasing safety. Also, the network does not penetrate walls and does not bleed into other rooms. For example, in a university or large office building setting, creating secure networks only in a specified area, like one conference room or lecture hall, is highly desirable. However, other frequencies above 5 GHz may be used.

Universal serial bus or USB as used herein refers to any current or future iteration of USB including, but not limited to, USB 2.0, USB 3.0, and USB4, the implementation of which is apparent to one of ordinary skill in the art. A USB device is any device that accepts USB format, including but not limited to a TV, display screen, camera, document camera, and web camera.

As used herein, the term host computer or host computer device refers to any stand-alone computing device including, but not limited to, desktop, laptop, notebook, smartphone, workstation, and tablet. The host computer typically has a network interface card for communicating with a computer network. The network interface card of the host computer device is bypassed by the present invention, a non-obvious technique to achieve the invention's purposes described herein. The term host device includes a host computer device and other devices, such as but not limited to an analog speaker, that are not equipped with a component to facilitate network communication.

The term physically connected refers to a wired connection using physical cables and ports or hardware, including circuitry, to allow two computing devices to communicate. The two computing devices may be external to one another, such as the USB dongle and host computer, as discussed below. Alternatively, the two computing devices may be integrated as a single unit. For example, the DEEP apparatus may be integrated into a remote device such as a video camera.

FIG. 1A illustrates a prior art system including a network-connected camera 101 at a position remote from a host computer 102 while a locally attached wired webcam 107 is also connected to the host computer 102 via the host computer's internal USB media pipeline 104. For the wired webcam 107, the host computer 102 already has a built-in USB Video Class (UVC) driver support, and the USB media pipeline 104 brings it in as a trusted or safe device. As a result, the host computer 102 accepts the webcam 107 as a standard USB camera device within the operating system (OS). All third-party applications 105 running on the host computer 102 can readily see the webcam 107 as soon as it is plugged in and recognized by the host computer 102's OS. If any of the third-party applications 105 has implemented a list of available camera devices, webcam 107 will show up as an available option. This happens for the webcam 107 without installing proprietary drivers from the webcam vendor. However, this is not the case for wireless camera 101. Network camera 101, often connected wirelessly, must connect to the host computer 102 through the TCP/IP software stack 103, which must execute on the host computer 102, typically through sockets defined in the TCP/IP stack by the camera viewer application 106. Worth noting is that TCP/IP 103 must be within the runtime environment of host computer 102's OS, along with the additional camera viewer application 106, which is the only application that can access the wireless camera once the connection is successfully established. The picture does not illustrate that a proprietary driver must also be installed between the TCP/IP stack 103 and camera view app 106.

An important aspect to be noted is that none of the third-party applications 105 can have any visibility nor access to the network camera 101. Network camera 101 does not appear in the host computer 102's OS as a USB camera device. To the third-party apps 105, network camera 101 does not exist. FIG. 1A illustrates the two completely separated networking and USB-wired connection domains. Network camera 101 must form a closed loop data flow, or it is of the nature of a device data bubble or a "walled garden." This is not a desirable limitation or departmentalization characteristic. It is in contrast against the wired webcam 107, which functions in an open and widely compatible fashion with all other applications 105 running on the host computer 102's OS.

Figure 1B:
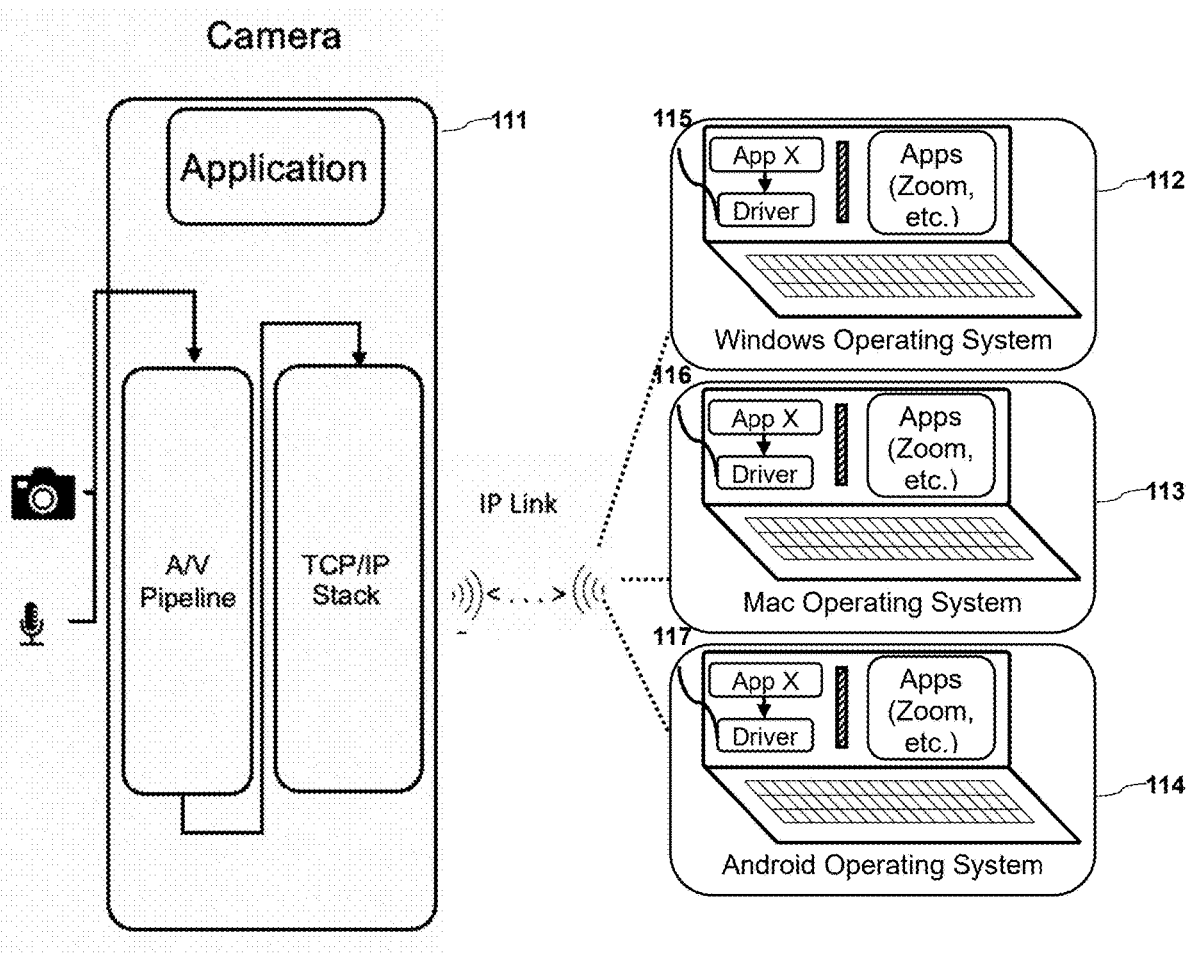
FIG. 1B illustrates how a prior art system must be implemented individually for each host computer operating system type.

FIG. 1B illustrates a typical vendor's prior art system. Vendor A's Wi-Fi Camera 111, along with vendor's driver and application software 115, 116, and 117, is OS platform dependent, and instructions, or known to software developers as code, must be developed to execute its software on each OS. For Vendor A's camera 111 to connect with a host computer, Vendor A must ensure its driver software and App X software 115, for example, work with the TCP/IP stack running on the host computer. Because every operating system has an entirely different system architecture and implementation, including the computer programming language used to develop these OS. Therefore, drivers and application software (sometimes drivers and application software can be in just the application in integrated form) from the vendor, must be written from scratch for each operating system and computer type as illustrated 112, 113, 114. This requires specialized software engineering teams to adapt their software to each and every OS environment. It is expensive, time-consuming, technically complex, error-prone, and sometimes impractical for a single company to undertake.

Figure 2:
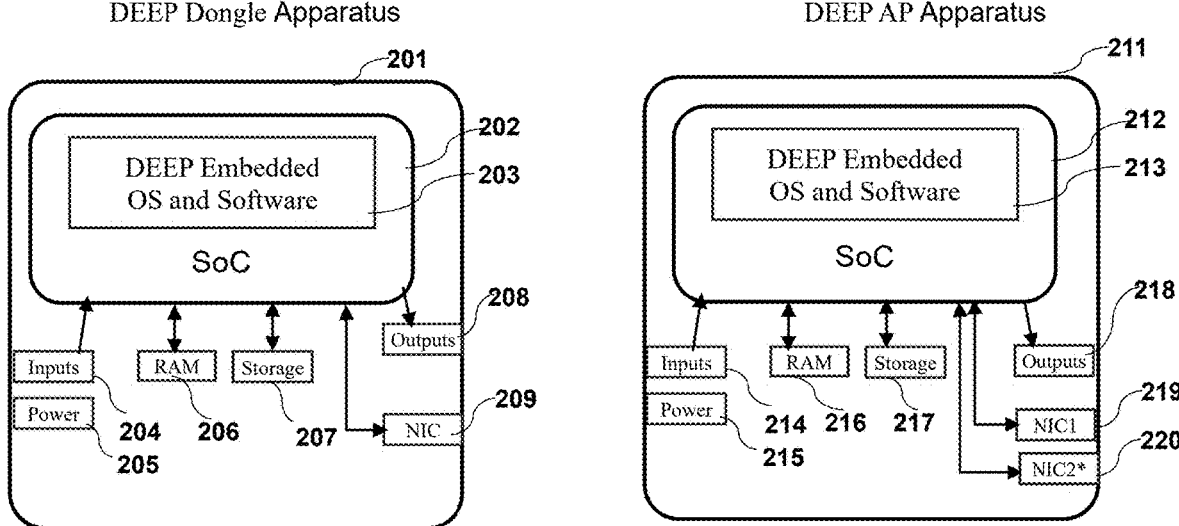
FIG. 2 illustrates the physical configuration of a DEEP dongle apparatus hardware along with the operating system software and DEEP-specific software stack.

FIG. 2 illustrates a pair of apparatuses according to an embodiment of the present invention. DEEP Transceiver Dongle Apparatus 1 201 includes a Computer System on Chip (SoC) 202, along with RAM 206 and Non-Volatile Storage such as a Solid State Drive (SSD) 207, in either embedded or built-in form or externally attached form; a set of input port(s) singular or plural 204, a set of output connector ports singular or plural 208, a power source port 205, along with a Network Interface Card (NIC) 209 which communicates to another DEEP Transceiver Dongle Apparatus 2 202 via an Internet Protocol (IP) network link. A certain type of embedded operating system (embedded OS), such as Android OS, Linux OS, or potentially other small footprint, low energy consumption, and often open-source OS software running as the manager platform with DEEP dongle apparatus specific app software stack 203 controlling the methods to fulfill the wireless networking extension and protocol emulation data and logic flow for the apparatus 201. DEEP transceiver or access point (AP) dongle apparatus 211 includes a SoC 212 along with RAM 216 and storage 217 in either embedded form or attached to fulfill the general computing functions required for supporting the DEEP embedded OS and app software 213, along with inputs 214, outputs 218, power port 215, and importantly one or more NIC cards 219 and 220

Figure 3:
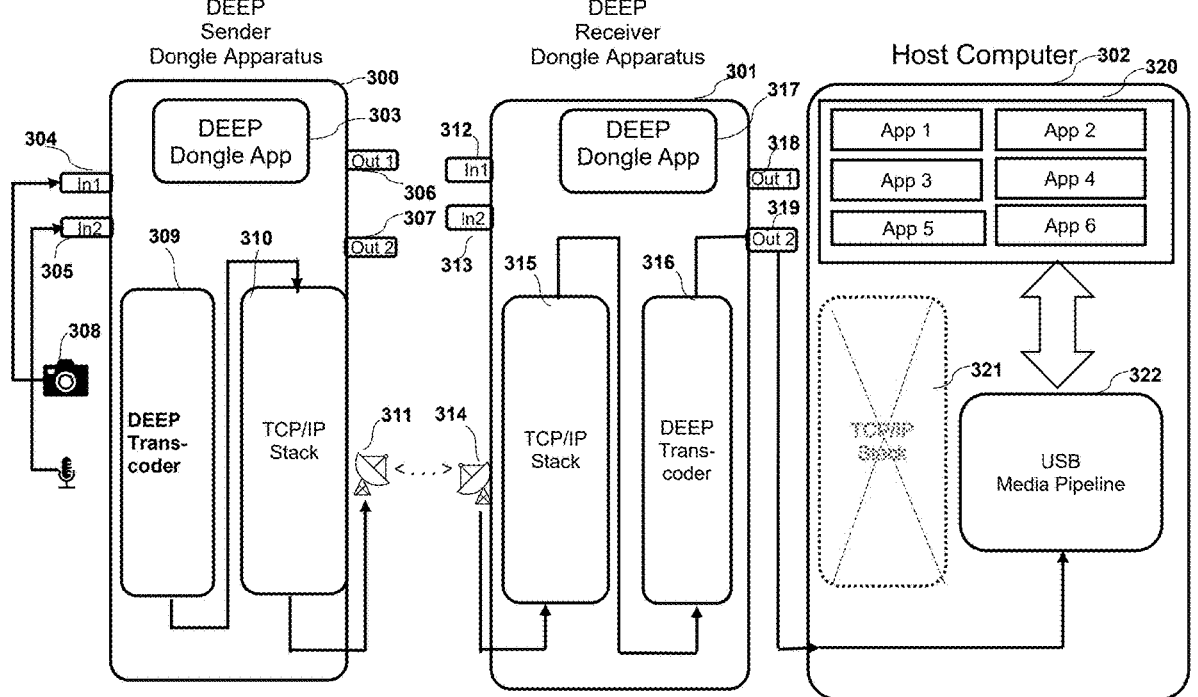
FIG. 3 illustrates a typical embodiment of a pair of DEEP dongle apparatuses working with a remote camera and a host computer system over a wireless link.

FIG. 3 illustrates the system configuration for a camera and a microphone device 308, which are typically connected to a host computer 302 through a wired USB connection through the USB media pipeline 322, are now extended to connect from a remote position through a pair of DEEP sender dongle apparatus 300 and DEEP receiver dongle apparatus 301 via the IP network link pair 311 and 314. The camera and mic device set 308 are typically connected to a host computer 302 via either USB UVC and UAC, or the microphone can connect through an audio line in port. The UVC or UAC data streams traditionally connect through the USB media pipeline 322. Since the USB media pipeline is accessible globally within the host computer 302, all third-party apps 320 can access and utilize the camera or microphone 308. This process is driverless due to the built-in support in all modern operating systems for the USB standard protocol. This is the desired driverless plug-and-play state of peripheral device connection with a host computer. It is also worth noting that such driverless plug-and-play convenience works equally well across virtually all modern-day operating systems with built-in support for the USB protocol, eliminating the need for custom-developed drivers for each operating system. However, once it is desirable to extend the connection between the peripheral device and a host computer wirelessly, the camera and mic set 308 in this example illustration, based on the status quo of technology today, would have to let the data flow as network packets, instead of UVC or UAC data, connecting through the host computer 302's TCP/IP stack 321. This TCP/IP Stack 321 path leads to a dead end because only the camera and mic's player software app running on the host computer 302 can access the network data packets. This closed-loop situation can be considered a proprietary data bubble or a walled garden to which third-party apps have no access. The current invention creates a different system configuration utilizing a pair of two sender and receiver apparatuses, DEEP sender dongle apparatus 300 and DEEP receiver dongle apparatus 301, bypassing completely and relocating the functions of TCP/IP Stack 321 which normally "resides" and executes within the host computer 302 to the apparatus pair 300 and 301, implemented as the pair of internal TCP/IP stacks 310 and 315 over an IP network link through NIC card pair 311 and 314, encapsulated inside the apparatus pair 300 and 301.

These apparatuses are dedicated hardware and software devices, physically separate from the host computer 302. Such relocated TCP/IP stack function traditionally only executes on host computer 302. It can be considered as finding itself in a pair of surrogates in embedded software forms of TCP/IP stack software 310 and 315. DEEP sender dongle apparatus 300 has input ports 304 on the sender end. The camera and mic set 308 connects to the input ports 304, then subsequently, DEEP dongle app 303, which is data and logical flow controller running on the dongle apparatus 300, parses and directs the data stream received from the input ports to determine whether there is a need for decoding and re-encoding the data stream through the DEEP transcoder 309, and once the potential transcoding is processed, pass on the data stream to TCP/IP stack 310. The data stream then travels through the TCP/IP network link and NIC 311 to reach NIC 314 on the receiver end apparatus 301. Upon receiving the data stream, the receiver end TCP/IP stack 315 forwards it to DEEP Dongle App 317. DEEP dongle app 317 parses the data stream, analyzes the data stream, decodes the data stream if necessary, and then determines if the data stream needs to be re-encoded according to the data format required by the output port 319, which in this example is a USB OTG port that can be connected to the USB media pipeline 322 on the host computer 302.

Again, in this example, the input data stream received from apparatus 300 is encoded into the UVC and UAC data stream and passed on through the USB media pipeline 322. The host computer 302 recognizes the camera and mic devices relayed and connected wirelessly from the remote end connected to sender apparatus 300 but considers the camera and mic locally connected. Since the DEEP transcoder 316 has produced a fully emulated UVC and UAC protocol data stream, host computer 302 accepts these remote devices as locally attached devices via wire or cable and makes them appear in the system's device list. All third-party apps 320 can now access the remotely connected wireless camera and mic as if they are locally plugged in as a webcam. This novel approach fully utilizes the creation of a pair of hardware apparatuses 300 and 301 which are separate from the host computer 302, including another pair of fully encapsulated surrogate TCP/IP stacks 310 and 315 bypassing the TCP/IP stack 321 on the host computer 302, relocating 302 to inside the apparatuses, to extend a USB device wirelessly over an IP network link; furthermore, the apparatuses' App software 303 and 317 work in conjunction with transcoder stacks 310 and 316 emulating data streams into UVC and UAC data formats. This configuration fulfills the functions of a dedicated hardware apparatus and internal embedded software to extend wired or cable connections wirelessly while emulating a local wired connection protocol and acts as a proxy for the remote device. This architecture is called Dedicated Extension and Emulation Proxy (DEEP) system architecture.

Figure 4:
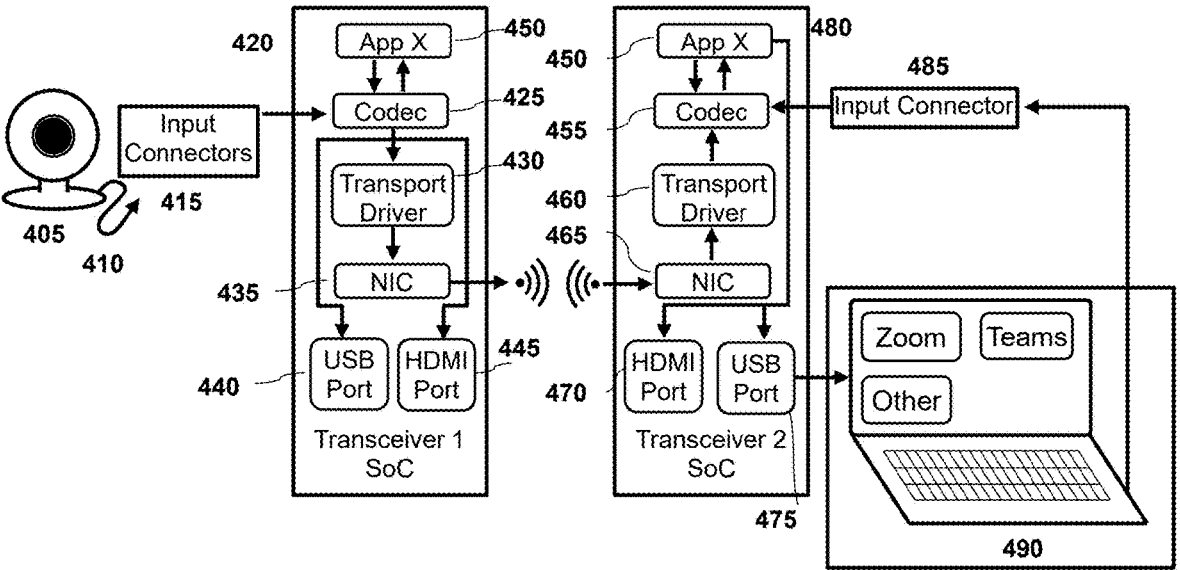
FIG. 4 illustrates the methods implemented on the DEEP dongle apparatus substrate and the logic flow internally to the methods.

FIG. 4 further illustrates the internal elements of the DEEP Dongle Apparatus in an embodiment of having the Host Computer 490 both accepting USB port input from the DEEP Transceiver Dongle Apparatus 480 and outputting HDMI video data stream through the input connector 485 into the DEEP Transceiver Dongle Apparatus 480. Input Connector 485 for DEEP Transceiver Dongle Apparatus 480 is an HDMI connector port in this embodiment. Inside the DEEP Transceiver Dongle Apparatuses 420 and 480, overall device hardware and software functions are controlled or managed by App X 450. Encoding and decoding functions are implemented as in Codec 425 and 455. The combined decoding and encoding functions constituted the function of Transcoding. The Transport Drivers 430 and 460 communicate through an IP network link with their counterpart in DEEP Transceiver Dongle Apparatus 480 noted as 460 and 465 to form a pair of TCP/IP Stack as the surrogates for the TCP/IP stack that typically runs on the host computer 490. In this embodiment, both the DEEP transceiver dongle apparatus 420 and 480 have additional local output ports, which are USB OTG ports 440 and 475, where 475 is the ultimate output port that provides the input from the remote camera 405 to the Host Computer 490 to enable the remote camera 405 to appear as a locally connected USB webcam, therefore DEEP transceiver dongle apparatus 480 acts as the emulation proxy. The combined effect of the surrogate network stack and the emulation proxy creates the magical effort of having an invisible wire, meaning the Host Computer 490 "considers" the remote camera as locally connected via a wire or cable, but there is no physical wire linking the remote camera 405 to the host computer 490. Example applications running on the host computer 490, such as Zoom and Teams, will "see" the remote camera 405 as a locally connected webcam, further illustrating the invisible wire effect. In reciprocal, the HDMI video output from the Computer 490 enters the DEEP Transceiver Dongle Apparatus 480 through a USB Host Port 485, will be forwarded through App X for data flow control, a potential transcoding step through CODEC 455, Transport Driver 460, NIC 465, and subsequently transmitted to NIC 435, Transport Driver 430, App X 450, and ultimately be directed to one or both of the local ports USB Port 440 and/or HDMI Port 445. For local playback device, such as a TV (not shown) or another host computer (not shown), the remote desktop video of Host Computer 490 appears as if it is a locally connected video source via wire either in the form of a webcam (to the unshown host computer) or as a HDMI video source to be displayed via a HDMI cable, except there is no wire connecting the Host Computer 490 from its remote location to these two local playback or display devices. This indicates the invisible wire effect can be achieved for bi-directional data streams.

Figure 5A:
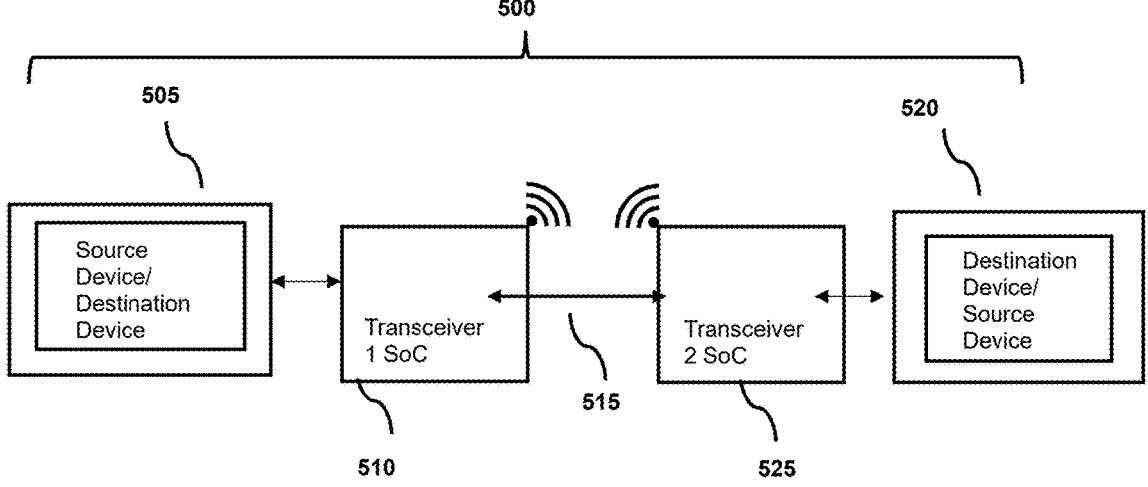
FIG. 5A illustrates a peer-to-peer topology using a pair of DEEP dongle Apparatuses to two remotely positioned devices.

FIG. 5A illustrates a typical device configuration in a typical peer-to-peer embodiment. A source device of the type of one of a variety of devices, including but not limited to a personal computer, a microphone, a camera, a display TV, an interactive flat panel display, speaker(s), mouse or keyboard, a VR goggle, etc. is represented by 505 and 520. DEEP Transceiver dongle apparatus 510 and DEEP transceiver dongle apparatus 525 work as a pair in this peer-to-peer network layout. Content data streams from the pair of destination/source devices "travel" bi-directionally, linking both sides with the invisible wire effects.

Figure 5B:
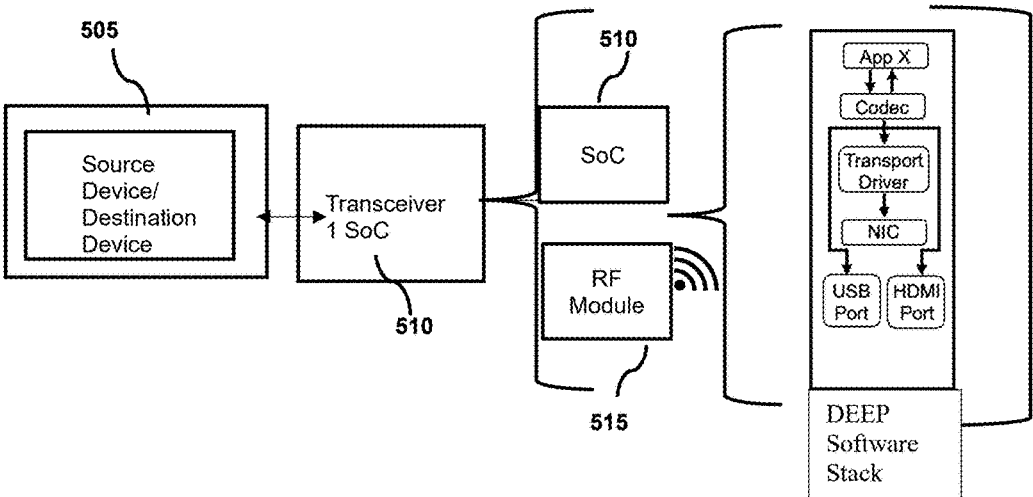
FIG. 5B illustrates an exploded view of a single DEEP dongle apparatus detailing the hardware configuration of the apparatus and the software methods executing on the hardware.

FIG. 5B illustrates the exploded view for DEEP Transceiver Dongle Apparatus 510 to show the internal hardware components SoC 510 and RF Module 515; further illustrated is the DEEP Software Stack runs on top of the hardware substrate of 510 and 515.

Figure 6:
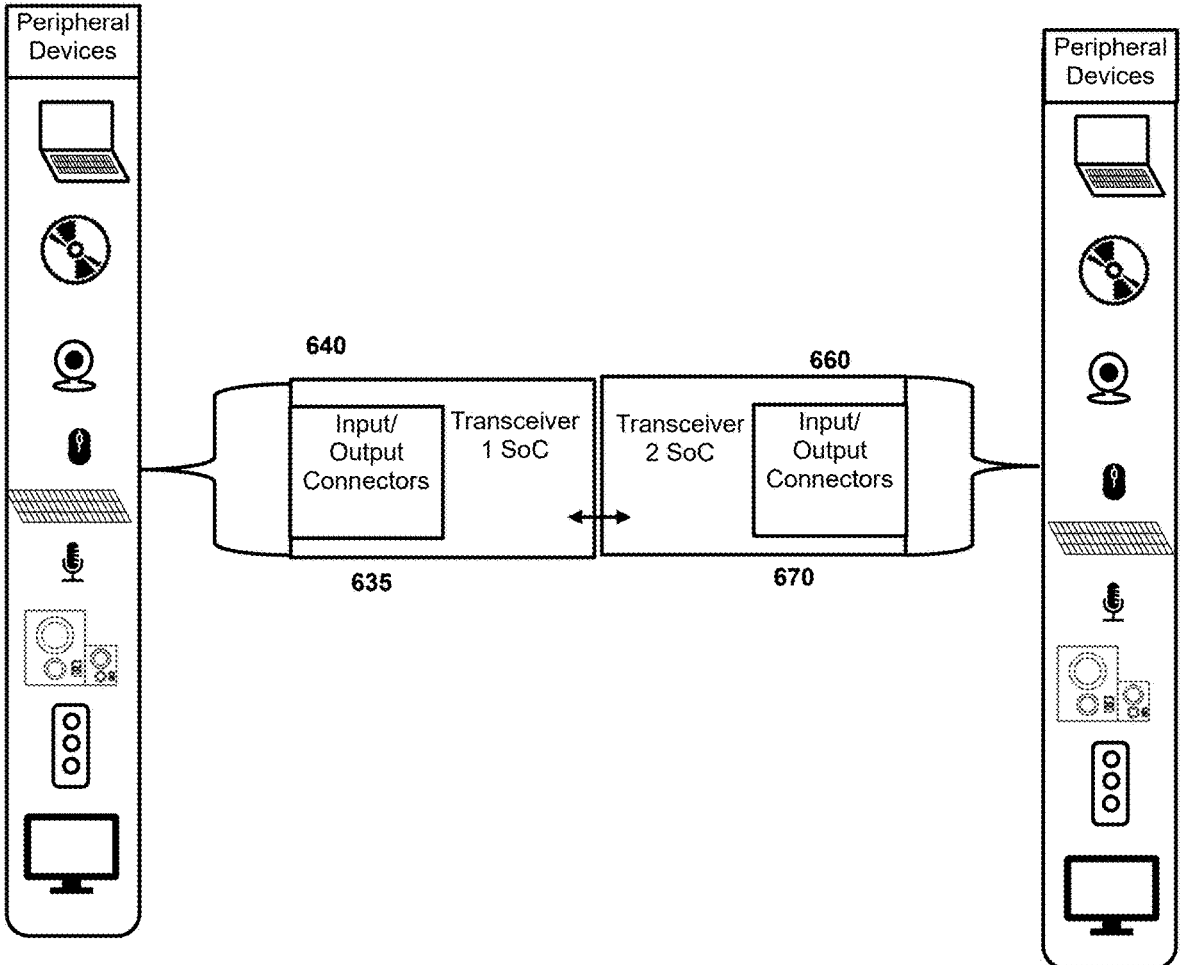
FIG. 6 illustrates a peer-to-peer configuration of a pair of DEEP dongle apparatuses (shown as Transceiver 1 and Transceiver 2) connecting, over a network link, a plethora of destination and source devices positioned apart.

FIG. 6 illustrates a plethora of devices in an embodiment where both sides of a peer-to-peer connection can include but are not limited to a personal computer, a microphone, a camera, a display TV, an interactive flat panel display, speaker(s), mouse or keyboard, a VR goggle, etc.

Figure 7A:
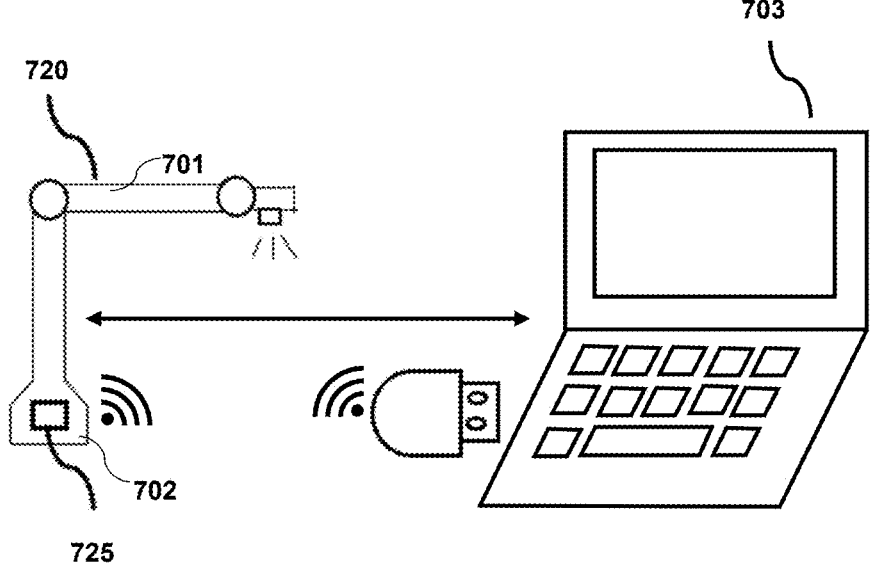
FIG. 7A illustrates an embodiment when a DEEP dongle apparatus is structurally embedded inside a wireless document camera device with a miniaturized DEEP dongle apparatus connecting to a host computer.

FIG. 7A illustrates an embodiment where a normally USB-connected document camera device 720 can be linked to a Host Computer 703 through wireless extension NIC 702 and appear to the Host Computer 703 as if the camera 720 is magically linked through an invisible wire.

Figure 7B:
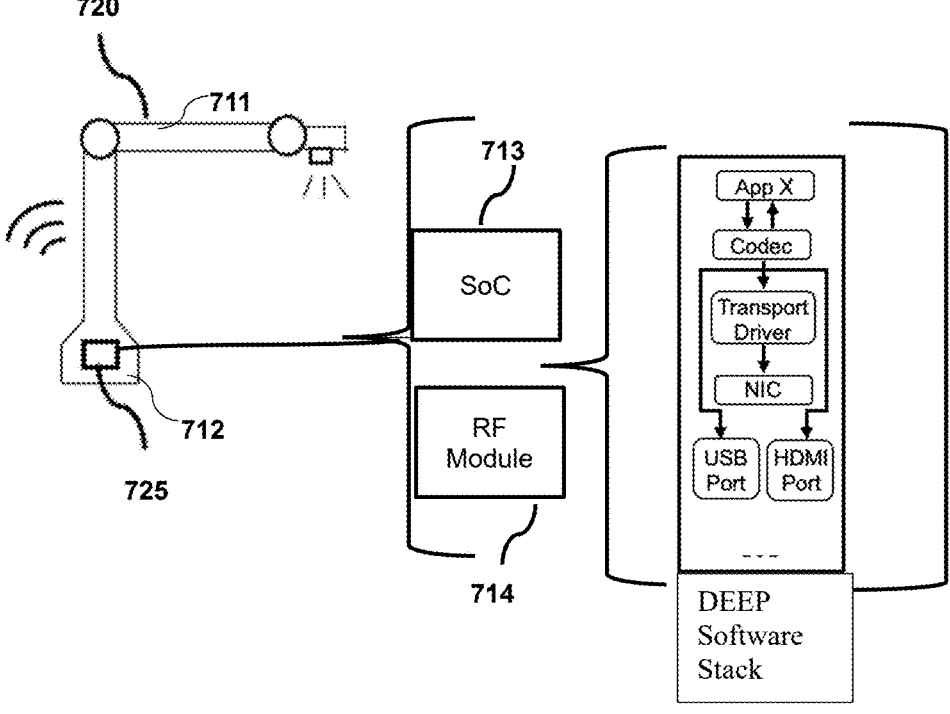
FIG. 7B illustrates an exploded view of the wireless document camera's DEEP dongle hardware apparatus and software methods.

FIG. 7B is an exploded view of the DEEP Transceiver Dongle Apparatus 725, embedded mechanically inside the document camera 720.

Figure 8:
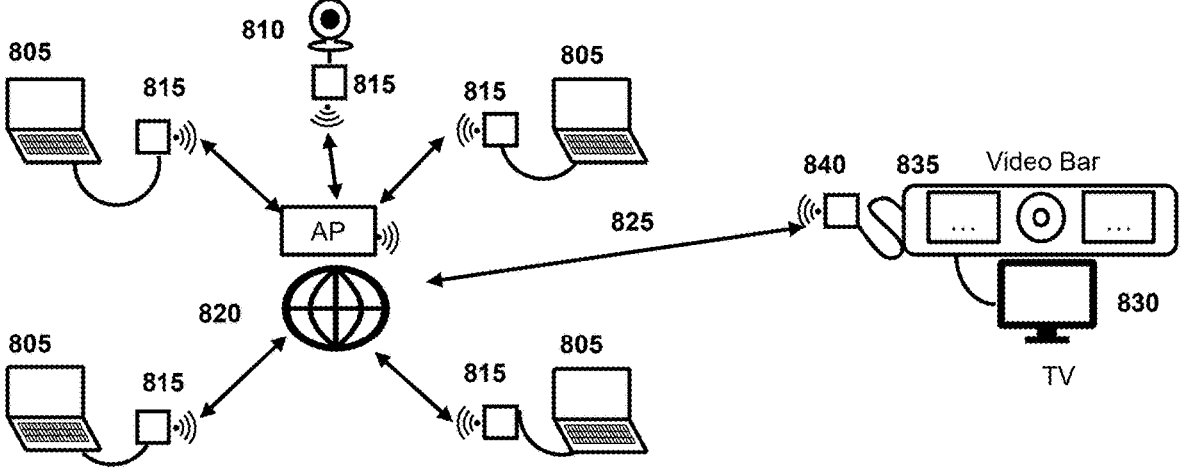
FIG. 8 illustrates an embodiment of a plural of DEEP dongle apparatuses, each attached to a plural of source and destination devices employing one particular DEEP dongle apparatus as AP, forming a star-topology network.

FIG. 8 illustrates an embodiment where a video bar 835, connected with a TV 830 for display and linked into a network of DEEP transceiver dongle apparatuses in an AP-Station model, star topology. All network linkage in this topology goes through DEEP transceiver dongle apparatuses 840 and 815s (x5). DEEP transceiver dongle apparatus 820 is configured with multiple NIC cards and acts as the AP for the network. Four host computer devices 805, and one camera device 815 are connected. In this embodiment, any computer device 805 can communicate and cast content from its desktop to any other computer 805 as if it were a locally connected webcam via a USB port. The camera video from the Video Bard 835 would appear as if it is locally connected with any one of the computer devices 805. The other remote camera 810 appears as another USB webcam locally connected to any one of the computers. In reciprocal, any of the computer devices 805 can have their desktop shown on the TV 830 via the DEEP Transceiver Dongle Apparatus 840. This illustrates that the bi-directional network connections are like two-way invisible wires linking a device to every other device in a multipoint-to-multipoint fashion.

While the invention has been described in connection with a number of embodiments and implementations, the invention is not so limited but covers various apparent modifications and equivalent arrangements, which fall within the purview of the appended claims. Although features of the invention are expressed in certain combinations among the claims, it is contemplated that these features can be arranged in any combination and order. The invention has been described herein using specific embodiments for illustrative purposes only. It will be readily apparent to one of ordinary skill in the art, however, that the principles of the invention can be embodied in other ways. Therefore, the invention should not be regarded as limited in scope to the specific embodiments disclosed herein; it should be fully commensurate in scope with the following claims.

We claim:

1. A computer device implementing a self-encapsulated TCP/IP stack and communicating via a network link with a peer computer device physically connected to a remote device, comprising:

a first computer comprising an embedded operating system and a network interface component, wherein the first computer receives, via the network link, communications from the peer computer device according to TCP/IP, the communications from the peer computer device comprising a multimedia data stream generated by the remote device;

an output port configured to physically connect the first computer to a host device, wherein the first computer is implemented within a shared enclosure with the host computer or external to an enclosure of the host device;

a physical connector that couples the first computer, via the output port, to the host device as a peripheral device;

wherein the first computer is configured to bypass and relocate a networking protocol stack of the host device by executing the self-encapsulated TCP/IP stack within the first computer such that the network link is transparent to the host device; and wherein the first computer communicates the media data stream, via the output port, to the host device according to a protocol associated with the output port to emulate a locally tethered wired connection between the host device and the remote device.

2. The computer device of claim 1, wherein the protocol associated with the output port is selected from the group consisting of: USB, HDMI, and analog audio.

3. The computer device of claim 1, wherein the network interface component is a network interface card (NIC) comprising a radio frequency (RF) wireless communication module.

4. The computer device of claim 3, wherein the RF wireless communication module comprises a 60 GHz transceiver.

5. The computer device of claim 1, wherein the first computer comprises a system-on-chip (SoC) or an application-specific integrated circuit (ASIC).

6. The computer device of claim 1, wherein the computer device is integrated into the host device through the shared enclosure.

7. The computer device of claim 1, wherein the network link is a wireless network link.

8. The computer device of claim 1, wherein the network interface component comprises a plurality of network interface cards (NICs) configured to facilitate a network access point (AP) or a router.

9. A computer device, implementing a self-encapsulated TCP/IP stack and communicating via a network link with a peer computer device physically connected to a remote device, comprising:

a first computer comprising an embedded operating system and a network interface component, wherein the first computer receives, via the network link, communications from the peer computer device according to TCP/IP, the communications from the peer computer device comprising a multimedia data stream generated by the remote device;

an output port configured to physically connect the first computer to a host device, wherein the first computer is configured to bypass and relocate a networking protocol stack of the host device by executing the self-encapsulated TCP/IP stack within the first computer such that the network link is transparent to the host device;

wherein the first computer communicates the media data stream, via the output port, to the host device according to a protocol associated with the output port to emulate a locally tethered wired connection between the host device and the remote device; and wherein the computer device is a USB dongle.

10. A computer device implementing a self-encapsulated TCP/IP stack and communicating via a network link with a peer computer device physically connected to a host device, comprising:

a first computer comprising an embedded operating system and a network interface component, wherein the first computer sends, via the network link, communications to the peer computer device according to TCP/IP, the communications comprising a media data stream;

an input port configured to physically connect the first computer to a local device generating the media data stream, wherein the first computer is implemented within a shared enclosure with the local device or external to an enclosure of local device;

a physical connector that couples the first computer, via the input port, to the local device;

wherein the first computer is configured to bypass a networking protocol stack of the host device and utilize a self-encapsulated TCP/IP stack executing within the peer computer device; and wherein the first computer receives the media data stream, via the input port, from the local device according to a protocol associated with the input port to emulate a locally tethered wired connection between the host device and the local device.

11. The computer device of claim 10, wherein the protocol associated with the input port is selected from the group consisting of: USB, HDMI, and analog audio.

12. The computer device of claim 10, wherein the network interface component is a network interface card (NIC) comprising a radio frequency (RF) wireless communication module.

13. The computer device of claim 12, wherein the RF wireless communication module comprises a 60 GHz transceiver.

14. The computer device of claim 10, wherein the first computer comprises a system-on-chip (SoC) or an application-specific integrated circuit (ASIC).

15. The computer device of claim 10, wherein the computer device is integrated into a personal computer, tablet, or camera.

16. The computer device of claim 10, wherein the network link is a wireless network link.

17. The computer device of claim 10, wherein the network interface component comprises a plurality of network interface cards (NICs) configured to facilitate a network access point (AP) or a router.

18. A computer device implementing a self-encapsulated TCP/IP stack and communicating via a network link with a peer computer device physically connected to a host device, comprising:

a first computer comprising an embedded operating system and a network interface component, wherein the first computer sends, via the network link, communications to the peer computer device according to TCP/IP, the communications comprising a media data stream;

an input port configured to physically connect the first computer to a local device generating the media data stream;

wherein the first computer is configured to bypass a networking protocol stack of the host device and utilize a self-encapsulated TCP/IP stack executing within the peer computer device;

wherein the first computer receives the media data stream, via the input port, from the local device according to a protocol associated with the input port to emulate a locally tethered wired connection between the host device and the local device; and wherein the computer device is a USB dongle.

* * * * *